(12) United States Patent
Banks

(10) Patent No.: US 9,976,477 B2
(45) Date of Patent: May 22, 2018

(54) SECONDARY ENGINE COVERS

(71) Applicant: Lewis Banks Limited, Hertfordshire (GB)

(72) Inventor: Graham Banks, Hertfordshire (GB)

(73) Assignee: Lewis Banks Limited, Hertfordshire (GB)

( * ) Notice: Subject to any disclaimer, the term of this patent is extended or adjusted under 35 U.S.C. 154(b) by 57 days.

(21) Appl. No.: 15/139,944

(22) Filed: Apr. 27, 2016

(65) Prior Publication Data

US 2017/0009650 A1  Jan. 12, 2017

(30) Foreign Application Priority Data

Jul. 10, 2015 (GB) .................................. 1512085.0

(51) Int. Cl.
| F02B 77/08 | (2006.01) |
| B62J 27/00 | (2006.01) |
| B62J 23/00 | (2006.01) |

(52) U.S. Cl.
CPC ............. F02B 77/083 (2013.01); B62J 23/00 (2013.01); B62J 27/00 (2013.01)

(58) Field of Classification Search
CPC ........... F02B 77/083; B62J 23/00; B62J 27/00
See application file for complete search history.

(56) References Cited

U.S. PATENT DOCUMENTS

| 9,578,908 B2 * | 2/2017 | Berns | ..................... A41D 27/00 |
| 2004/0251657 A1 * | 12/2004 | Kan | ......................... B62J 27/00 280/304.3 |
| 2005/0146114 A1 * | 7/2005 | Griffin | ..................... B62J 23/00 280/304.3 |
| 2007/0119363 A1 * | 5/2007 | Neto | ........................ F16L 11/12 116/208 |
| 2011/0251324 A1 * | 10/2011 | Banks | ....................... C08K 7/14 524/406 |
| 2012/0180919 A1 * | 7/2012 | Larregain | ............... B60C 11/00 152/209.18 |
| 2014/0199503 A1 * | 7/2014 | Hugo | ..................... B60G 7/001 428/34.1 |
| 2014/0367011 A1 * | 12/2014 | Colby | ................. B60C 11/0323 152/209.17 |

FOREIGN PATENT DOCUMENTS

| DE | 4330127 A1 | 3/1995 |
| DE | 202010008693 U1 | 11/2010 |

(Continued)

OTHER PUBLICATIONS

Espacenet, English Machine Translation of Application No. DE202010008693U1, published Nov. 18, 2010, retrieved from http://worldwide.espacenet.com on Jan. 27, 2017 (6 pages).

(Continued)

*Primary Examiner* — Joseph Dallo
*Assistant Examiner* — Kurt Liethen
(74) *Attorney, Agent, or Firm* — Wood Herron & Evans LLP

(57) ABSTRACT

According to the present invention, there is provided a secondary engine cover formed from a polymeric material comprising a wear indicator, wherein the wear indicator comprises a region of reduced thickness of polymeric material and wherein the region of reduced thickness comprises a blind hole.

8 Claims, 6 Drawing Sheets

(56) References Cited

FOREIGN PATENT DOCUMENTS

| EP | 2374845 A2 | 10/2011 |
|---|---|---|
| FR | 2827830 A1 | 1/2003 |
| GB | 2479405 A | 10/2011 |
| GB | 2492099 A | 12/2012 |
| WO | 2010106112 A1 | 9/2010 |
| WO | 2013115810 A1 | 8/2013 |

OTHER PUBLICATIONS

European Patent Office, European Search Report, Application No. 16165498.3, dated Nov. 18, 2016 (5 pages).
Espacenet, English Machine Translation Abstract, Application No. DE4330127A1, published Mar. 9, 1995, retrieved from http://worldwide.espacenet.com on Apr. 20, 2016 (1 page).
Espacenet, English Machine Translation Abstract, Application No. FR2827830A1, published Jan. 31, 2003, retrieved from http://worldwide.espacenet.com on Apr. 20, 2016 (1 page).
United Kingdom Intellectual Property Office, Patents Act 1977: Combined Search and Examination Report under Sections 17 and 18(3), Application No. GB1512085.0, dated Jan. 7, 2016 (5 pages).

* cited by examiner

SECONDARY ENGINE COVERS

CROSS-REFERENCE TO RELATED APPLICATIONS

The present application claims priority under 35 U.S.C. § 119 of Great Britain Patent Application No. 1512085.0, filed Jul. 10, 2015, the disclosure of which is hereby incorporated herein by reference in its entirety.

FIELD OF THE INVENTION

The present invention relates to secondary engine covers comprising a wear indicator. It is particularly applicable to a motorcycle secondary engine covers comprising a wear indicator.

BACKGROUND OF THE INVENTION

When a motorcycle crashes the stock metal engine covers invariably hit the ground, and can break or wear away, causing an oil spill. When excessive impact or wear is present the stock cover will either crack, with either the initial or subsequent impact, or wear right through the stock metal engine cover, when the motorcycle travels for a long duration on its side.

This leads to the engine oil spilling out on to the track or road. This causes a very hazardous oil spill for other motorcycles and other vehicles in general. In the case of other motorcycles, this invariably leads to more and potentially fatal crash scenarios.

The conventional method for protecting the stock metal covers are to attach a composite material such as carbon fibre or Kevlar®, or replaceable billet aluminium or steel plates and/or bars. These methods are either very costly or are inadequate in practice.

Another method is to attach a material such as polycarbonate which although provides good protective properties, these properties are rendered obsolete on contact with petroleum, or long term UV exposure. Given spillage often occurs on re-fuelling especially in race scenarios, a product which is likely to fail on exposure to petroleum will not give the required level of comfort that damage to the bike and thus an oil spill will potentially occur after a crash.

GB2479405 Lewis Banks Ltd describes one solution to these problems, namely a polymeric and long glass fibre composition for use in injection molded protective articles including secondary engine covers and motorcycle secondary engine covers. The use of this composition in injection molded protective articles advantageously results in a protective article which is of significantly reduced cost compared with replacing the damaged part, i.e., an engine cover casing after a fall on a motorcycle. As the protective article can be produced at a significantly reduced cost, there is more benefit to the owner of an, e.g., motorcycle, to use a protective article, resulting in oil spills from cracked or worn primary, e.g., engine cover casings.

Furthermore, the composition also allows for absorption of forces which are generated on impact, because forces are absorbed by the composition the protective article does not shatter and break on impact, thus transmitting the forces directly to the primary eg engine cover casing and therefore the engine that it is supposed to be protecting.

The composition also allows for increased wear compared with the stock eg engine cover casings and compared with the prior art Carbon Fibre or Kevlar® secondary eg engine cover casings. This means that the protective article does not necessarily need to be replaced every time the protective article comes into contact with the ground in a crash. If the crash is only minor and not at high speed and not over a long distance, then there may only be a small amount of wear or scuffing on the protective article meaning it can be left in place without needing to be changed, whereas in the same crash with the stock or prior art articles a change would have been required.

However, because of the high performance and durability of the protective article sometimes it isn't replaced when it is in need of replacement, i.e., it is worn to such a degree that a final crash may not protect the engine as intended. This practice is not only false economy, but potentially reduces rider safety.

SUMMARY OF THE INVENTION

According to a first aspect of the present invention, there is provided a secondary engine cover formed from a polymeric material comprising a wear indicator.

Preferably, the wear indicator comprises a region of reduced thickness of polymeric material.

Preferably, the wear indicator comprises a plurality of regions of reduced thickness of polymeric material.

Preferably, the thickness of the region of reduced thickness is between 1 mm and 2.5 mm, more preferably 1.5 mm and 2 mm, most preferably 1.7 mm.

Preferably, the region of reduced thickness comprises a blind hole, depression, recess or the like. Preferably, in use when the region of reduced thickness of polymeric material is worn away a hole through the secondary engine cover is created which indicates that the secondary engine cover should be replaced.

Alternatively, the blind hole, depression, recess or the like is infilled with a material that is visually distinct from the polymeric material. In this alternative, preferably in use when the region of reduced thickness of polymeric material is worn away the visually distinct infill material become visible which indicates that the secondary engine cover should be replaced.

It is recommended and encouraged that teams, and track day public, replace the secondary engine cover after each and every crash, to ensure the best rider safety possible.

However, because of some products inherent high performance and durability, this good practice has not always been followed. Some deem that it is not always necessary to change, a practice that it is not wished to encourage and which should be changed.

In this invention, wear indicators are created in one alternative in the form of round holes appearing in on the top surface of the secondary engine cover when crucial areas of material of the secondary engine cover have been worn down. This allows Scrutineers and team technicians and riders to evaluate the secondary engine covers visually, and base their decisions on what they see easily, should the secondary engine cover not be replace automatically after a fall or crash as recommended.

DETAILED DESCRIPTION OF THE PREFERRED EMBODIMENTS

Figure 1:
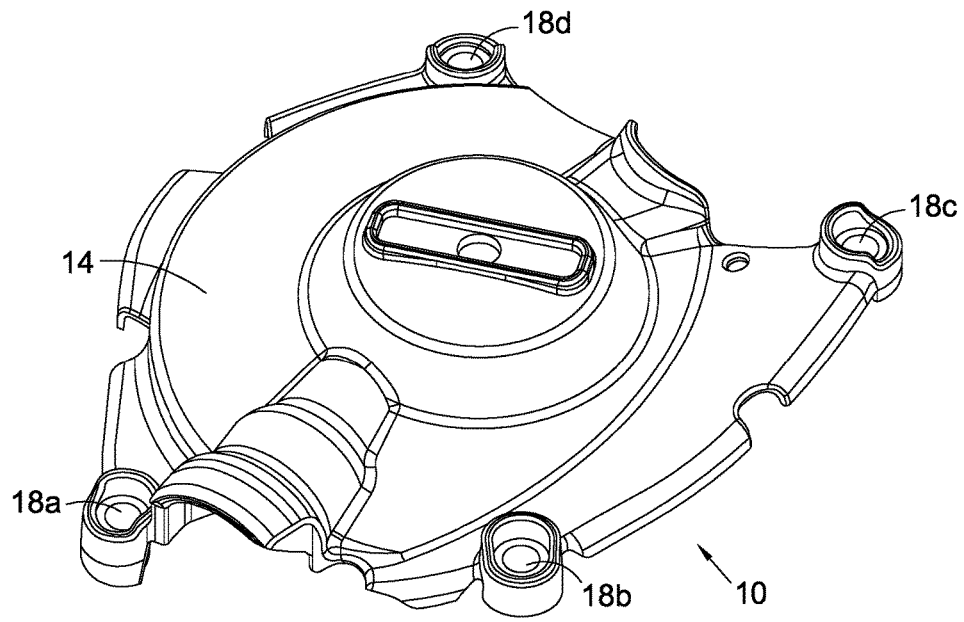
FIG. 1 illustrates a top view of a secondary engine cover according to a first embodiment of the present invention.

FIGS. 1 to 4 illustrate a secondary engine cover 10 according to a first embodiment of the present invention. The secondary engine cover 10 is intended, in use, to bolt on to a motor cycle over an existing engine cover casing using bolt holes 18a to 18d. The secondary engine cover 10 has a top surface 14 and a bottom surface 16. The thickness of the secondary engine cover 10 varies depending on the wear requirements across the secondary engine cover 10, but is typically between 2 mm and 12 mm.

The secondary engine cover 10 is formed from a composition which includes a polymeric material and long glass fibres.

The long glass fibres are typically present in the range of 50-70%. The long glass fibres provided for increased wear and protection of the composition when formed into a protective article. The inclusion of 60% long glass fibres is particularly beneficial because it allows a balance of high wear properties with a balance of impact properties.

The polymer is typically selected from polyamides, polyesters, polyalkenes, and silicones. These polymeric materials are generally resistant to contact with petroleum, or long term UV exposure. The polyamide may be selected from polyphthalamide (PPA), polycaprolactam (nylon 6), polyhexamethylene adipamide (nylon 6,6) and aromatic polyamides (Aramid Fibres). The polyalkene may be selected from polyethylenes (PE), polypropylenes (PP) and polytetrafluroethylenes (PTFE). The polyester may be selected from polyterephthalic acid (PTA).

The composition may also include a flow modifier. Typically, the flow modifier, if used, is an easy mold flow modifier. The use of an easy flow modifier not only assists when using the composition in the injection molding process itself, which is the preferred method of forming the protective article, but also results in much stronger protective article. The easy flow modifier means that the long glass fibres flow more smoothly into the mold, which results in less breakage of the fibres and in turn a much stronger protective article as more of the fibres remain long and reinforce the polymeric material. One example of an easy flow modifier is molybdenum disulfide. This is because molybdenum disulfide not only acts as an easy flow modifier, but also acts as a tracer element to aid detection of the composition when formed into a protective article. This is advantageous as the molybdenum disulfide is readily detectable in the protective article formed from the composition and acts as a method for detecting whether the protective article is in fact formed from the composition of the invention or a different composition. A typical amount of molybdenum disulfide is 3% to 5% of the total composition.

The composition may additionally include an impact modifier and/or an impact stabiliser.

Composition Example

The polymeric material is nylon 6.6.

The long glass filled fibres are present in a level of 60% of the total composition.

The flow modifier is Molybdenum Disulfide and is present in a level of 3-5% of the total composition.

Figure 2:
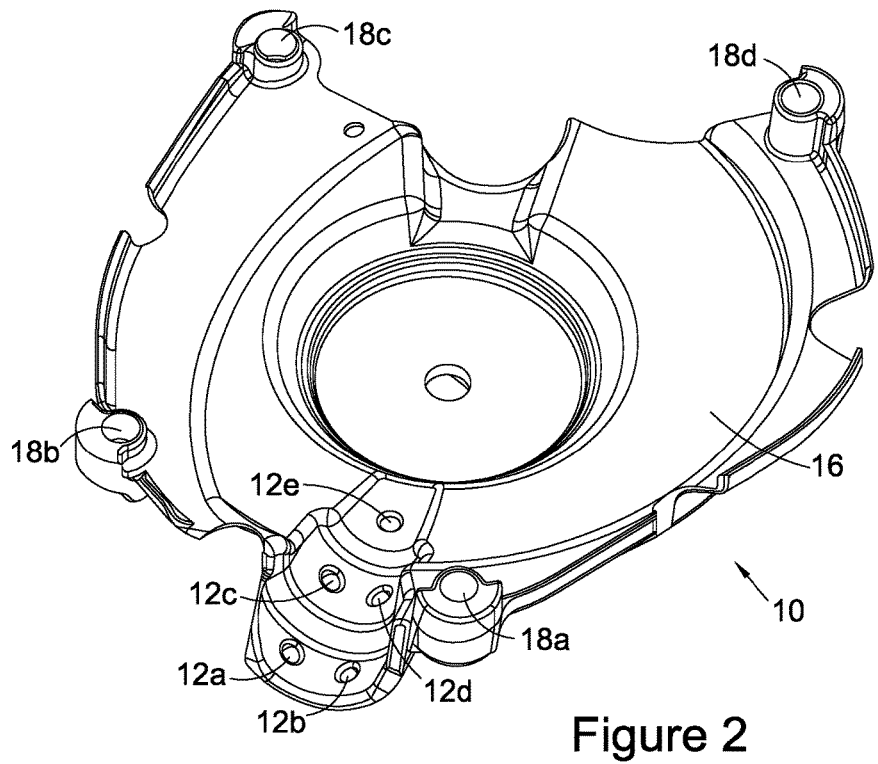
FIG. 2 illustrates a bottom view of a secondary engine cover according to a first embodiment of the present invention.

Turning to FIG. 2 which illustrates a bottom view of the secondary engine cover 10 a plurality of blind holes 12a to 12e are provided. The blind holes do not extend through to the top surface 14 of the secondary engine cover 10. The blind holes stop short of the top surface 14 of the secondary engine cover 10. Typically, 1 mm to 2.5 mm of material is present between end of each of the blind holes 12a to 12e and the top surface 14 of the secondary engine cover 10. In the embodiment illustrated, 1.7 mm of material is present between end of each of the blind holes 12a to 12e and the top surface 14 of the secondary engine cover 10.

The blind holes 12a to 12e are located in the region(s) of the secondary engine cover 10 most prone to wear.

In the alternative, illustrated the blind holes 12a to 12e are left unfilled. However, in an alternative the blind holes 12a to 12e may be filled with a material of a different colour to the main colour of the secondary engine cover 10. The infill material itself whilst being a different colour may be of the same or different composition to the main material of the secondary engine cover 10. The exact colour of the infill material is not of importance, only that it is visually different and distinct to the main colour of the secondary engine cover 10.

Further, in the alternative, it may be that no blind holes 12a to 12e are provided and instead the secondary engine cover 10 is formed from 2 different coloured materials, which may be the same composition of different compositions. The exact colour of the two materials is not of importance, only that they visually different and distinct to each other. In this alternative, the secondary engine cover 10 is formed such that the entire top surface is formed from one colour of material of a thickness of 1 mm to 2.5 mm and the remainder of the secondary engine cover 10 is formed from the other colour of material.

Figure 3:
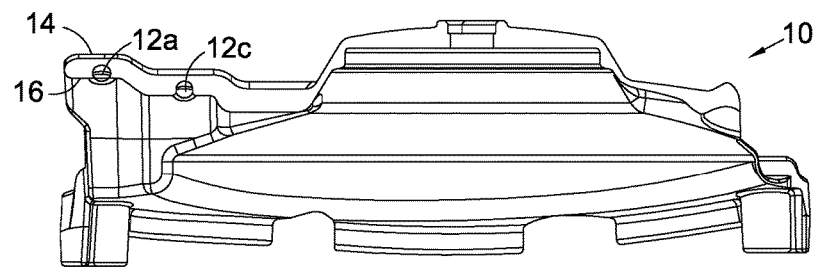
FIG. 3 illustrates a cross-sectional view of a secondary engine cover according to a first embodiment of the present invention.

FIG. 3 illustrates a cross-sectional view of the secondary engine cover 10 illustrating the depth of blind holes 12a and 12b and the amount of material present before the top surface 14.

Figure 4:
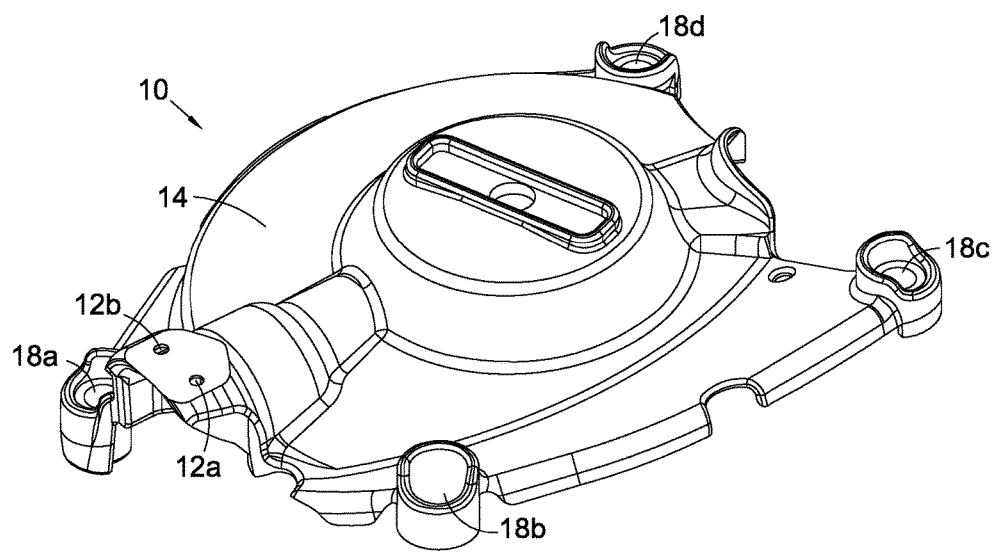
FIG. 4 illustrates a top cut away view of a secondary engine cover according to a first embodiment of the present invention.
Figure 5:
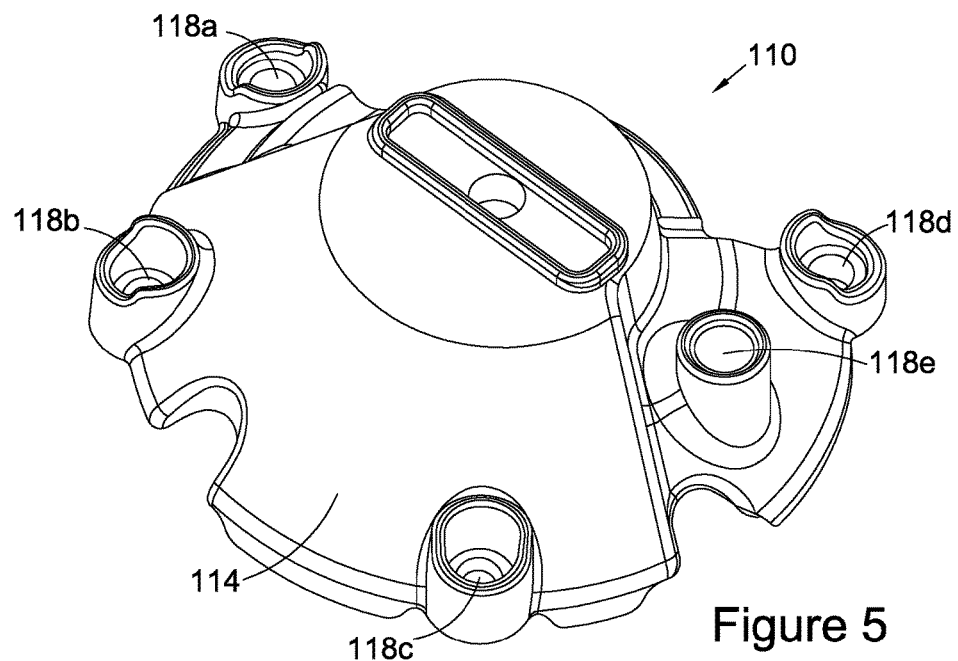
FIG. 5 illustrates a top view of a secondary engine cover according to a second embodiment of the present invention.

FIG. 4 illustrates a top cut away view of the secondary engine cover 10 in which two of the blind holes 12a, 12b have been exposed. This view exemplifies what would happen to the secondary engine cover 10 after the top surface has become worn, such as after a fall. In the areas around exposed blind holes 12a and 12b, the top surface of the secondary engine cover 10 has become sufficiently worn for replacement as typically at least 1 mm to 2.5 mm of material (depending on the depth of material left between the end of each of the blind holes 12a to 12e and the top surface 14 of the secondary engine cover 10). As stated above in the embodiment illustrated, 1.7 mm of material is present between end of each of the blind holes 12a to 12e and the top surface 14 of the secondary engine cover 10. The visual presence of the blind holes (now holes) 12a and 12b indicates to the user that the secondary engine cover 10 needs to be replaced.

In the alternative described above, where the blind holes 12a to 12e are filled with a material of a different colour to the main colour of the secondary engine cover 10, when the top surface becomes worn, as described above, instead of a hole becoming visible instead the infill material will become visible which is visually different and distinct to the main colour of the secondary engine cover 10.

In the other alternative described above where no blind holes 12a to 12e are provided and instead the secondary engine cover 10 is formed from 2 different coloured materials, when the top surface 14 becomes worn, as described above, instead of a hole the material below the top surface 14 of material that is worn away will become visible which is visually different and distinct to the top surface 14 of the secondary engine cover 10.

FIGS. 5 to 8 illustrate a secondary engine cover 110 according to a second embodiment of the present invention. The secondary engine cover 110 is intended, in use, to bolt on to a motor cycle over an existing engine cover casing using bolt holes 118a to 118e. The secondary engine cover 110 has a top surface 114 and a bottom surface 116. The thickness of the secondary engine cover 110 varies depending on the wear requirements across the secondary engine cover 110, but is typically between 2 mm and 12 mm.

The secondary engine cover 110 is formed from a composition which includes a polymeric material and long glass fibres as described in relation to the first embodiment above.

Figure 6:
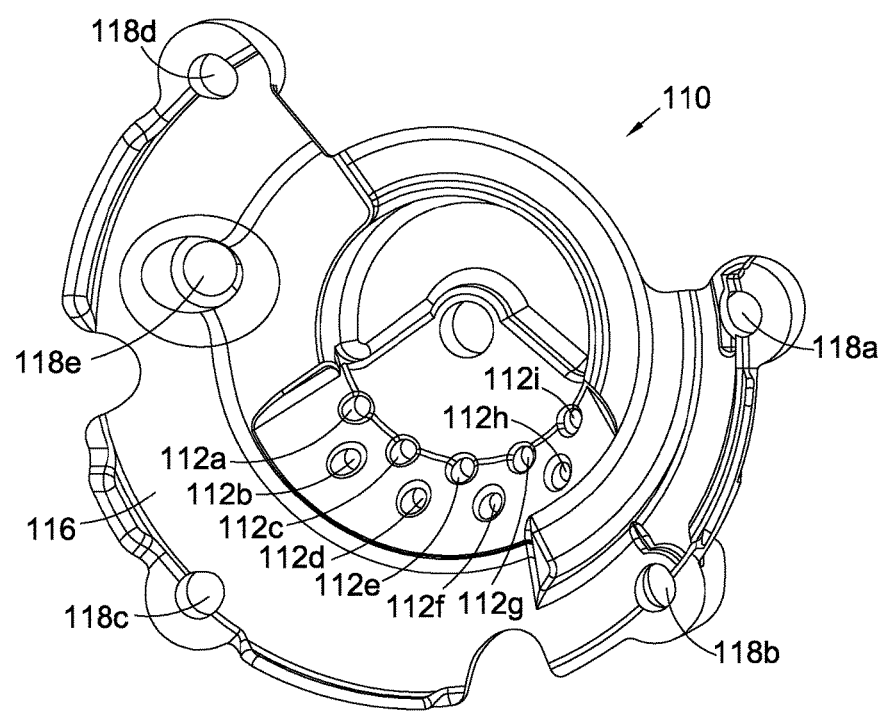
FIG. 6 illustrates a bottom view of a secondary engine cover according to a second embodiment of the present invention.

Turning to FIG. 6 which illustrates a bottom view of the secondary engine cover 110, a plurality of blind holes 112a to 112i are provided. The blind holes do not extend through to the top surface 114 of the secondary engine cover 110. The blind holes stop short of the top surface 114 of the secondary engine cover 110. Typically, 1 mm to 2.5 mm of material is present between end of each of the blind holes 112a to 112i and the top surface 114 of the secondary engine cover 110. In the embodiment illustrated, 1.7 mm of material is present between end of each of the blind holes 112a to 112i and the top surface 114 of the secondary engine cover 110.

The blind holes 112a to 112i are located in the region(s) of the secondary engine cover 110 most prone to wear.

In the alternative illustrated, the blind holes 112a to 112i are left unfilled. However, in an alternative as described in relation to the first embodiment, the blind holes 112a to 112i may be filled with a material of a different colour to the main colour of the secondary engine cover 110 as described above.

Further, in the alternative as described in relation to the first embodiment, it may be that no blind holes 112a to 112i are provided and instead the secondary engine cover 110 is formed from 2 different coloured materials, which may be the same composition of different compositions.

Figure 7:
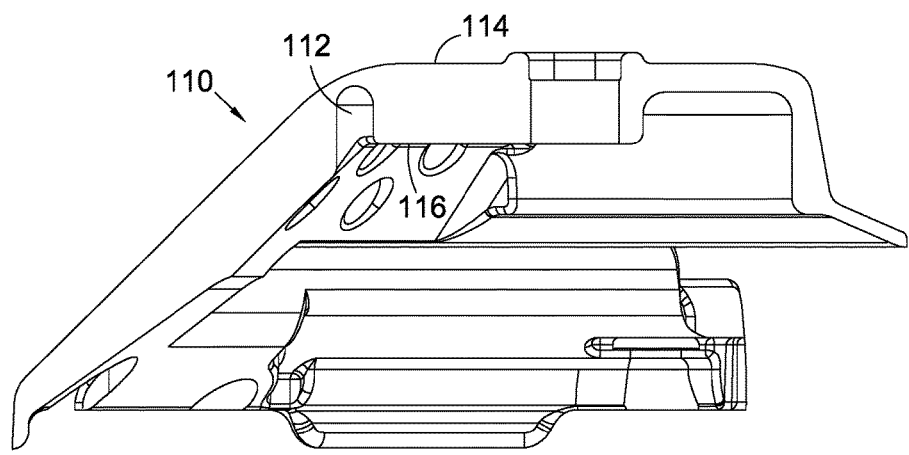
FIG. 7 illustrates a cross-sectional view of a secondary engine cover according to a second embodiment of the present invention.

FIG. 7 illustrates a cross-sectional view of the secondary engine cover 110 illustrating the depth of blind holes 112 in general and the amount of material present before the top surface 114.

Figure 8:
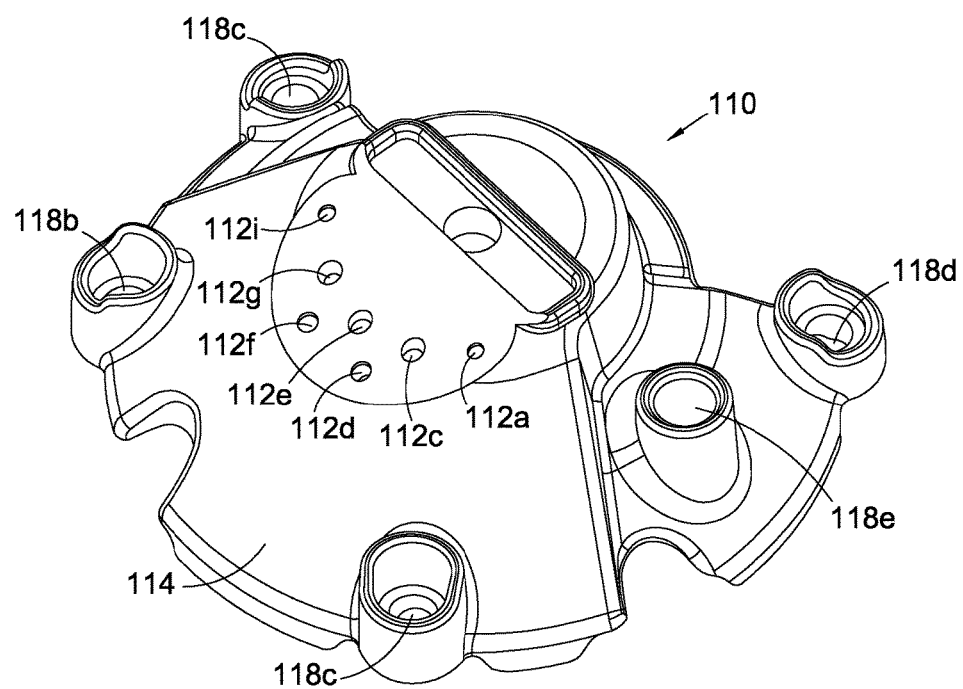
FIG. 8 illustrates a top cut away view of a secondary engine cover according to a second embodiment of the present invention.
Figure 9:
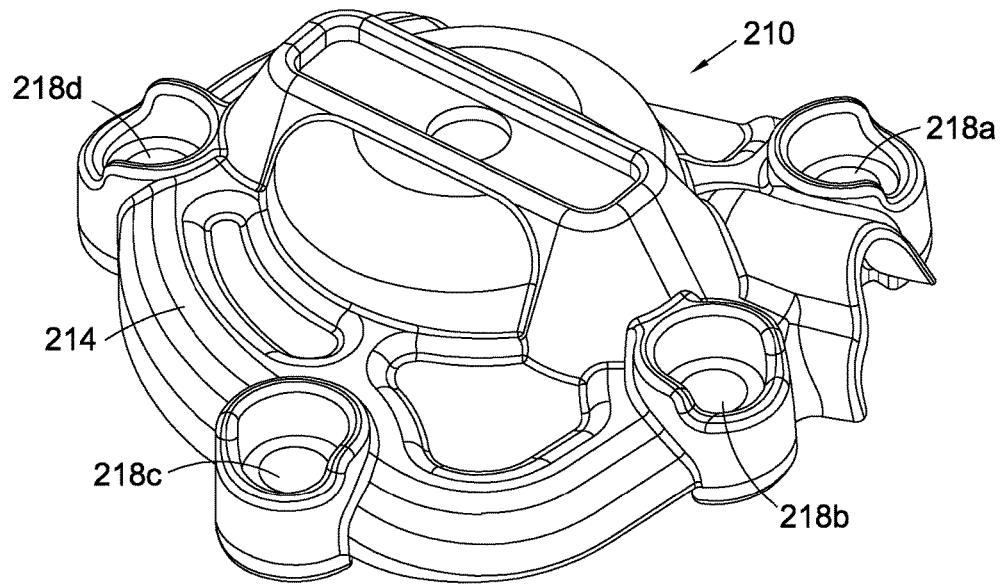
FIG. 9 illustrates a top view of a secondary engine cover according to a third embodiment of the present invention.

FIG. 8 illustrates a top cut away view of the secondary engine cover 110 in which seven of the blind holes 112a, 112c, 112d, 112e, 112f, 112g, 112i have been exposed. This view exemplifies what would happen to the secondary engine cover 110 after the top surface has become worn, such as after a fall. In the areas around exposed blind holes 112a, 112c, 112d, 112e, 112f, 112g, 112i, the top surface of the secondary engine cover 110 has become sufficiently worn for replacement as typically at least 1 mm to 2.5 mm of material (depending on the depth of material left between the end of each of the blind holes 112a to 112i and the top surface 114 of the secondary engine cover 110). As stated above in the embodiment illustrated, 1.7 mm of material is present between end of each of the blind holes 112a to 112i and the top surface 114 of the secondary engine cover 110. The visual presence of the blind holes (now holes) 112a, 112c, 112d, 112e, 112f, 112g, 112i indicates to the user that the secondary engine cover 110 needs to be replaced.

In the alternative described above, where the blind holes 112a to 112i are filled with a material of a different colour to the main colour of the secondary engine cover 110, when the top surface becomes worn, as described above, instead of a hole becoming visible instead the infill material will become visible which is visually different and distinct to the main colour of the secondary engine cover 110.

In the other alternative described above where no blind holes 112a to 121e are provided and instead the secondary engine cover 110 is formed from 2 different coloured materials, when the top surface 114 becomes worn as described above instead of a hole the material below the top surface 114 of material that is worn away will become visible which is visually different and distinct to the top surface 114 of the secondary engine cover 110.

FIGS. 9 to 12 illustrate a secondary engine cover 210 according to a second embodiment of the present invention. The secondary engine cover 210 is intended, in use, to bolt on to a motor cycle over an existing engine cover casing using bolt holes 218a to 218d. The secondary engine cover 210 has a top surface 214 and a bottom surface 216. The thickness of the secondary engine cover 210 varies depending on the wear requirements across the secondary engine cover 210, but is typically between 2 mm and 12 mm.

The secondary engine cover 210 is formed from a composition which includes a polymeric material and long glass fibres as described in relation to the first embodiment above.

Figure 10:
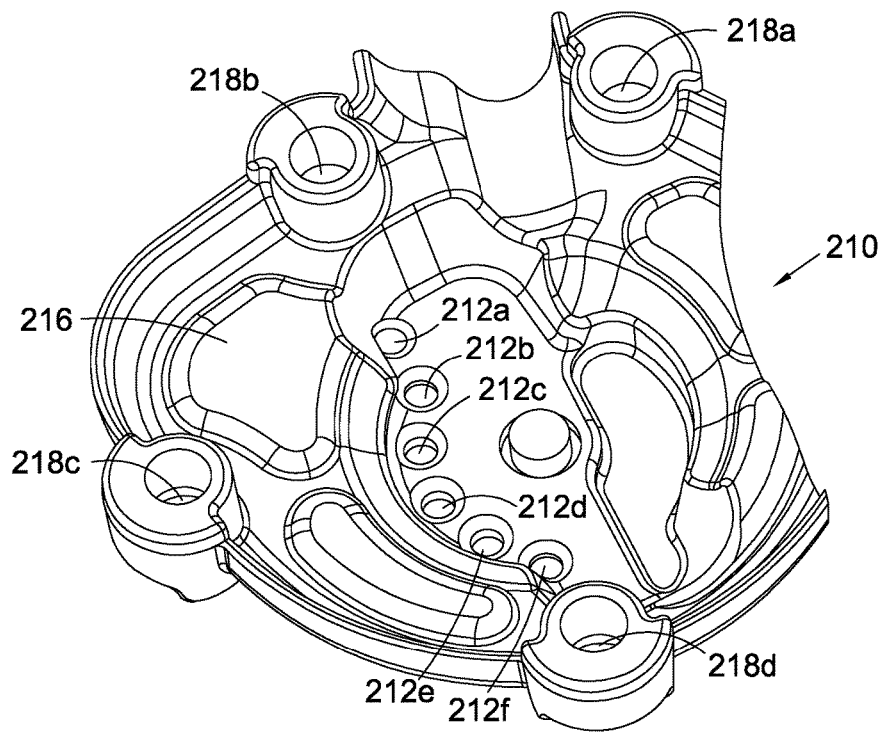
FIG. 10 illustrates a bottom view of a secondary engine cover according to a third embodiment of the present invention.

Turning to FIG. 10, which illustrates a bottom view of the secondary engine cover 210, a plurality of blind holes 212a to 212f are provided. The blind holes do not extend through to the top surface 214 of the secondary engine cover 210. The blind holes stop short of the top surface 214 of the secondary engine cover 210. Typically, 1 mm to 2.5 mm of material is present between end of each of the blind holes 212a to 212f and the top surface 214 of the secondary engine cover 210. In the embodiment illustrated, 1.7 mm of material is present between end of each of the blind holes 212a to 212f and the top surface 214 of the secondary engine cover 210.

The blind holes 212a to 212f are located in the region(s) of the secondary engine cover 210 most prone to wear.

In the alternative illustrated, the blind holes 212a to 212f are left unfilled. However, in an alternative as described in relation to the first embodiment the blind holes 212a to 212f may be filled with a material of a different colour to the main colour of the secondary engine cover 210 as described above.

Further, in the alternative as described in relation to the first embodiment, it may be that no blind holes 212a to 212f are provided and instead the secondary engine cover 210 is formed from 2 different coloured materials, which may be the same composition of different compositions.

Figure 11:
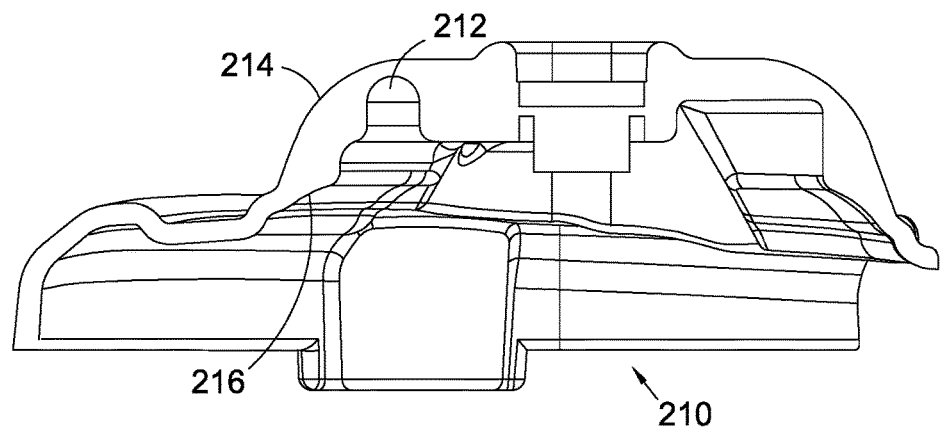
FIG. 11 illustrates a cross-sectional view of a secondary engine cover according to a third embodiment of the present invention.

FIG. 11 illustrates a cross-sectional view of the secondary engine cover 210 illustrating the depth of blind holes 212 in general and the amount of material present before the top surface 214.

Figure 12:
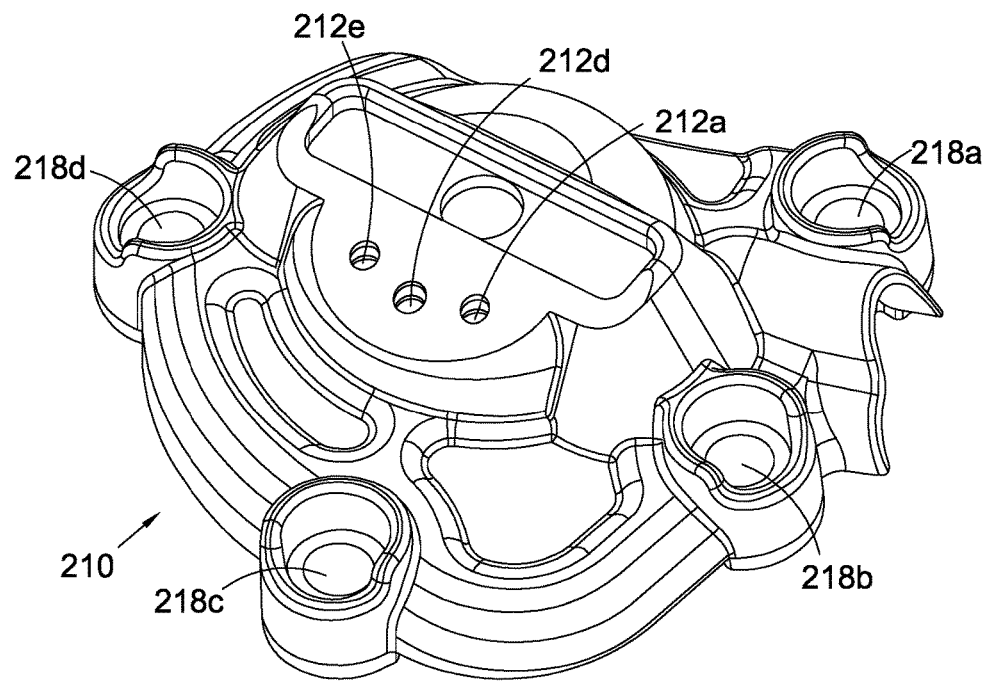
FIG. 12 illustrates a top cut away view of a secondary engine cover according to a third embodiment of the present invention.

FIG. 12 illustrates a top cut away view of the secondary engine cover 210 in which three of the blind holes 212c, 212d, 212e have been exposed. This view exemplifies what would happen to the secondary engine cover 210 after the top surface has become worn, such as after a fall. In the areas around exposed blind holes 212c, 212d, 212e, the top surface of the secondary engine cover 210 has become sufficiently worn for replacement as typically at least 1 mm to 2.5 mm of material (depending on the depth of material left between the end of each of the blind holes 212a to 212f and the top surface 214 of the secondary engine cover 210). As stated above in the embodiment illustrated, 1.7 mm of material is present between end of each of the blind holes 212a to 212f and the top surface 214 of the secondary engine cover 210. The visual presence of the blind holes (now holes) 212c, 212d, 212e indicates to the user that the secondary engine cover 210 needs to be replaced.

In the alternative described above, where the blind holes 212a to 212f are filled with a material of a different colour to the main colour of the secondary engine cover 210, when the top surface becomes worn as described above instead of a hole becoming visible instead the infill material will become visible which is visually different and distinct to the main colour of the secondary engine cover 210.

In the other alternative described above where no blind holes 212a to 121f are provided and instead the secondary engine cover 210 is formed from 2 different coloured materials, when the top surface 214 becomes worn, as described above, instead of a hole the material below the top surface 214 of material that is worn away will become visible which is visually different and distinct to the top surface 214 of the secondary engine cover 210.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A secondary engine cover formed from a polymeric material comprising a wear indicator, wherein the wear indicator comprises a region of reduced thickness of polymeric material and wherein the region of reduced thickness comprises a blind hole.

2. The secondary engine cover as claimed in claim 1 wherein the wear indicator comprises a plurality of regions of reduced thickness of polymeric material.

3. The secondary engine cover as claimed in claim 1 wherein the thickness of the region of reduced thickness is between 1 mm and 2.5 mm.

4. The secondary engine cover as claimed in claim 1 wherein the thickness of the region of reduced thickness is between 1.5 mm and 2 mm.

5. The secondary engine cover as claimed in claim 1 wherein the thickness of the region of reduced thickness is 1.7 mm.

6. The secondary engine cover as claimed in claim 1 wherein the blind hold is infilled with a material that is visually distinct from the polymeric material.

7. The secondary engine cover as claimed in claim 1 wherein, in use, when the region of reduced thickness of polymeric material is worn away, a hole through the secondary engine cover is created which indicates that the secondary engine cover should be replaced.

8. The secondary engine cover as claimed in claim 6 wherein, in use, when the region of reduced thickness of polymeric material is worn away, the visually distinct infill material become visible which indicates that the secondary engine cover should be replaced.

* * * * *